United States Patent
Bahrenburg et al.

(10) Patent No.: US 6,606,314 B1
(45) Date of Patent: Aug. 12, 2003

(54) METHOD AND RADIO STATION FOR DATA TRANSMISSION

(75) Inventors: Stefan Bahrenburg, München (DE); Christoph Euscher, Rhede (DE); Tobias Weber, Otterbach (DE); Paul Walter Baier, Kaiserslautern (DE); Jürgen Mayer, Schifferstadt (DE); Johannes Schlee, Blaustein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/495,794

(22) Filed: Feb. 1, 2000

Related U.S. Application Data

(63) Continuation of application No. PCT/DE98/02029, filed on Jul. 20, 1998.

(30) Foreign Application Priority Data

Aug. 1, 1997 (DE) .................................... 197 33 336

(51) Int. Cl.[7] ............................. H04B 7/00; H04B 7/26
(52) U.S. Cl. ...................... 370/347; 370/442; 370/458; 370/479; 370/913
(58) Field of Search ............................. 370/310, 328, 370/329, 335, 338, 342, 345, 347, 431, 441, 442, 458, 464, 479, 498, 902, 912, 913

(56) References Cited

U.S. PATENT DOCUMENTS

| | | | |
|---|---|---|---|
| 3,639,909 A | * 2/1972 | Hauck et al. | 340/172.5 |
| 5,142,534 A | 8/1992 | Simpson et al. | |
| 5,283,811 A | * 2/1994 | Chennakeshu et al. | 375/14 |
| 5,428,608 A | * 6/1995 | Freeman et al. | 370/60.1 |
| 5,592,514 A | * 1/1997 | Mobin | 375/336 |
| 5,838,718 A | * 11/1998 | Ichihashi | 375/202 |
| 5,905,962 A | * 5/1999 | Richardson | 455/522 |
| 5,995,499 A | * 11/1999 | Hottinen et al. | 370/337 |

FOREIGN PATENT DOCUMENTS

| | | |
|---|---|---|
| DE | 195 49 148 A1 | 7/1997 |
| DE | 197 33 336 A1 | 2/1999 |
| EP | 0 615 352 A1 | 9/1994 |
| EP | 0 767 543 A2 | 4/1997 |

OTHER PUBLICATIONS

"The GSM System for Mobile Communications" (Mouly et al.), Cell & Sys., Palaiseau, 1992, pp. 231–238.

"A joint detection CDMA mobile radio system concept developed within COST 231" (Jung et al.), Proceedings of the Vehicular Technology Conference, Jul. 1995, pp. 469–473.

* cited by examiner

Primary Examiner—Hassan Kizou
Assistant Examiner—Ahmed Elallam
(74) Attorney, Agent, or Firm—Laurence A. Greenberg; Werner H. Stemer; Ralph E. Locher

(57) ABSTRACT

In a method for data transmission in a radio communications system, a radio interface is subdivided into time slots for a transmission of bursts. In this case, the data are transmitted in data channels in a time slot, in which data channels can be distinguished by use of individual spread codes. A finite burst containing data symbols and at least one midamble with known symbols is used for data transmission in a data channel. At least one parameter is determined for the traffic conditions of the radio interface, and a ratio of a length of the midamble and a data part with data symbols is adjusted depending on the traffic conditions. The method is suitable in particular for use in 3rd generation TD/CDMA mobile radio networks.

11 Claims, 4 Drawing Sheets

METHOD AND RADIO STATION FOR DATA TRANSMISSION

CROSS-REFERENCE TO RELATED APPLICATION

This is a continuation of copending International Application PCT/DE98/02029, filed Jul. 20, 1998, which designated the United States.

BACKGROUND OF THE INVENTION

Field of the Invention

The invention relates to a method and a radio station for data transmission via a radio interface in a radio communications system, in particular in a mobile radio network.

In radio communications systems, information (for example voice, video information or other data) is transmitted using electromagnetic waves. The electromagnetic waves are in this case transmitted at carrier frequencies that are in the system for mobile communication (GSM), the carrier frequencies are in the region of 900 MHz. For future radio communications systems, for example the universal mobile telecommunication system (UMTS) or other $3^{rd}$ generation systems, frequencies are provided in the frequency band around 2000 MHz.

The transmitted electromagnetic waves are attenuated by losses due to reflection, refraction and transmission losses due to the earth's curvature and the like. This results in a reduction in the reception power that is available at the receiving radio station. This attenuation is position-dependent and, for moving radio stations, time-dependent as well.

Between a transmitting and a receiving radio station, there is a radio interface via which data transmission takes place using electromagnetic waves. Published, Non-Prosecuted German Patent Application DE 195 49 148 A1 discloses a radio communications system which uses code division multiple access (CDMA) subscriber separation, with the radio interface also having time-division multiplex access (TDMA) subscriber separation. Such a radio interface is also known from a reference by Jung et al., titled "A Joint Detection CDMA Mobile Radio System Concept Developed Within COST 231", IEEE, Proceedings of the vehicular technology conference, Chicago, Jul. 25–28, 1995, Volume 1, pages 469–473. A joint detection (JD) method is used at the receiving end in order to use knowledge of the spread codes of a plurality of subscribers to improve the detection of the transmitted data. In this case, it is known that a connection via the radio interface can be assigned at least two data channels, in which case each data channel can be distinguished by an individual spread code.

It is known from the GSM mobile radio network for transmitted data to be transmitted as radio blocks (bursts) within time slots, with midambles with known symbols being transmitted within a burst. The midambles may be used as training sequences in order to tune the radio station at the receiving end. The receiving radio station uses the midambles to estimate the channel impulse responses for various transmission channels. The length of the midambles is permanently defined, irrespective of the traffic conditions. Published, European Patent Application EP 0 615 352 A1 discloses a variably adjustable length for midambles in a TDMA system, in order to improve the channel estimation.

The number of channel impulse responses that can be estimated jointly represents a capacity-limiting factor for such radio communications systems. Since the number of symbols in the midambles is finite and a channel impulse response cannot be infinitely short, the number of channel impulse responses which can be estimated jointly is limited, as is the number of data channels transmitted jointly via the radio interface, as well.

SUMMARY OF THE INVENTION

It is accordingly an object of the invention to provide a method and a radio station for data transmission that overcome the above-mentioned disadvantages of the prior art methods and devices of this general type, which make better use of the radio resources of the radio interface.

According to the invention, in the method for data transmission in a radio communications system, a radio interface is subdivided into time slots for transmission of bursts. In this case, in one time slot, the data are transmitted in data channels, in which case the data channels can be distinguished by an individual spread code. A finite burst containing data symbols and at least one midamble with known symbols is used for data transmission in a data channel. At least one parameter is determined for the traffic conditions of the radio interface, and a ratio of a length of the midamble and a data part with data symbols is adjusted depending on the traffic conditions.

The limit on the number of channel impulse responses which can be estimated, and thus the limit on the number of connections which can be transmitted in a time slot can thus be overcome by lengthening the midamble. If the midamble is lengthened, then a greater number of connections can be transmitted. On the other hand, the midamble length can be shortened if there are only a small number of connections per time slot, so that a greater proportion of the time slot can be used for transmission of the data symbols. The capability to adjust the midamble length also applies to bursts within data channels of one connection type (wanted information, signaling information, organization information, access bursts).

According to advantageous developments of the invention, one parameter for the traffic conditions is:
the number of connections in the time slot, and/or
a terrain classification for a radio cell, and/or
the transmission quality in the time slot.

The number of traffic conditions per time slot, the present number and/or the desired number, takes account of the number of channel impulse responses which can be estimated.

The terrain classification takes account of the special features of individual radio cells. For example, greater scatter in the signal propagation times on different propagation paths can be observed in mountainous areas or fjords, as a result of which a long channel impulse response can be estimated. If the number of connections is constant, the midamble can be lengthened. On the other hand, in flat radio cells with few buildings, short channel impulse responses and thus short midambles can be used. The terrain classification may be predetermined (by the network plan), or may be derived from the present radio interface measured values.

The transmission quality, for example the bit error rate or the like, may be used as a parameter for estimating the quality of the channel estimation. If the previous length of the estimated channel impulse response is not sufficient, then this leads to poorer data detection. This can be counteracted by appropriately varying the ratio of the lengths of the midamble and data part.

If the midamble length is dynamically matched to the number of connections in the time slot and to the length of the channel impulse response to be estimated, then, on average, the spectral efficiency of the radio interface is improved.

According to a further advantageous refinement of the invention, the ratio of the length of the midamble and the data part with data symbols is adjusted as a function of time. Therefore, the midamble length is adapted, based on the present and/or desired traffic conditions at the radio interface. The structure of the burst is thus matched to the traffic conditions, without any major delay. This control can be carried out by a base station or by other network components.

The ratio of the length of the midamble and the data part with data symbols is alternatively or additionally adjusted for individual radio cells and/or for individual time slots. The traffic conditions fluctuate from radio cell to radio cell and from time slot to time slot, so that the flexibility of the radio communications system is improved if matching is carried out on an individual basis rather than across the network.

It is also within the scope of the invention for the midambles used in a time slot to be derived from a common midamble basic code. This allows the midambles to be produced particularly easily at the transmitting and receiving ends, and channel estimation to be carried out jointly for all the connections whose midambles have been derived from a common midamble basic code.

It is advantageous to assign a plurality of data channels to one connection, with the number of midambles that are used being less than the number of data channels. This reduces the channel estimation complexity. In addition, the number of possible data channels per time slot is increased, since a plurality of data channels use the same midamble, and the capacity-limiting influence of channel estimation has no effect on the data channels. It is likewise within the scope of the invention for the data channels with different midamble lengths to have different data rates. The different data rates may occur by varying the proportion of data symbols per time slot. Then, by way of example, voice transmission may be continued with a constant quality by switching to a so-called half-rate mode.

Other features which are considered as characteristic for the invention are set forth in the appended claims.

Although the invention is illustrated and described herein as embodied in a method and a radio station for data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
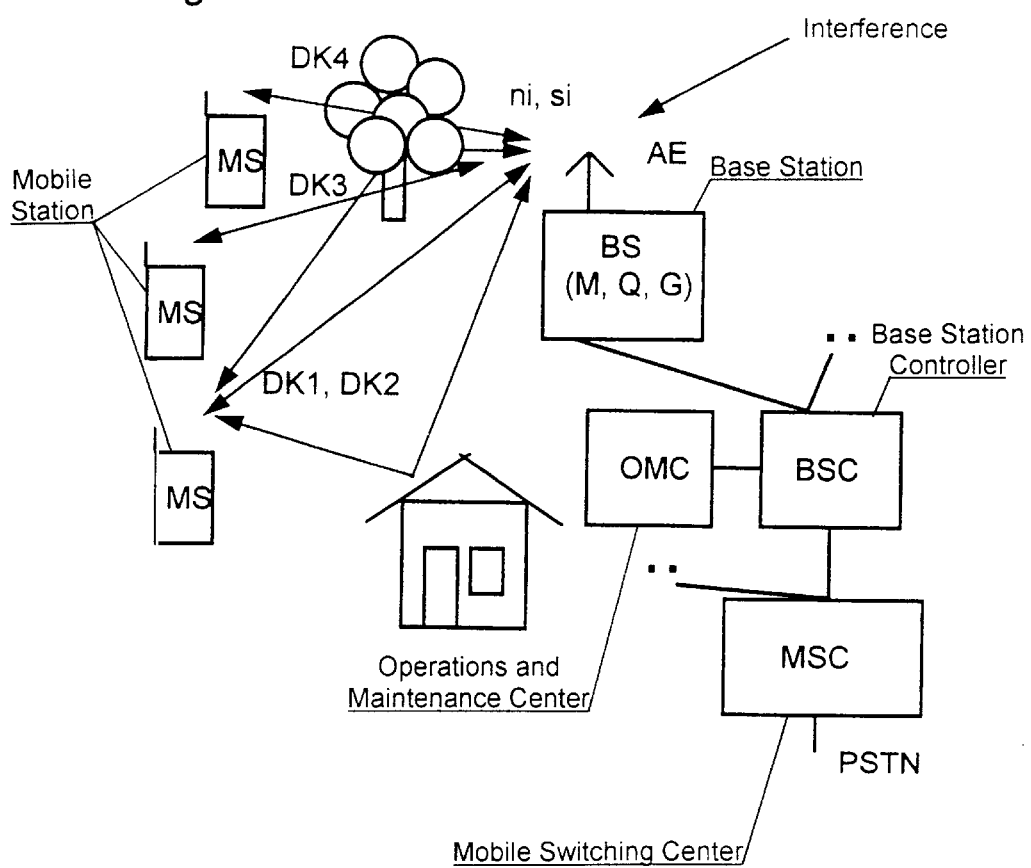
FIG. 1 is a block diagram of mobile radio network.

In all the figures of the drawing, sub-features and integral parts that correspond to one another bear the same reference symbol in each case. Referring now to the figures of the drawing in detail and first, particularly, to FIG. 1 thereof, there is shown a radio communications system corresponding to a known GSM mobile radio network. The system contains a large number of mobile switching centers MSC, which are networked to one another and produce access to a fixed network PSTN.

Furthermore, the mobile switching centers MSC are connected to in each case at least one base station controller BSC. Each base station controller BSC in turn allows a connection to at least one base station BS. Such a base station BS is a radio station which can set up a radio link to mobile stations MS via a radio interface.

By way of example, FIG. 1 shows three radio links for transmitting wanted information ni and signaling information si between the three mobile stations MS and the base station BS, with one mobile station MS being assigned two data channels DK1 and DK2, and the other mobile stations MS respectively being assigned a data channel DK3 or DK4. An operation and maintenance center OMC provides monitoring and maintenance functions for the mobile radio network, or for parts of it. The functionality of this structure is used by the radio communications system according to the invention; however, it can also be transferred to other radio communications systems, in which the invention can be used.

The base station BS is connected to an antenna device that contains, for example, three individual radiating elements. Each of the individual radiating elements radiates directionally into a sector of a radio cell supplied by the base station BS. However, alternatively, a greater number of individual radiating elements (based on adaptive antennas) may also be used, so that it is also possible to use space-division subscriber separation based on a space division multiple access method.

The base station BS provides the mobile stations MS with organization information relating to a location area LA and relating to the radio cell (radio cell identification). The organization information is transmitted simultaneously via all the individual radiating elements of the antenna device.

The connections with the wanted information ni and signaling information si between the base station BS and the mobile stations MS are subject to multi-path propagation, which is caused by reflections, for example on buildings, in addition to the direct propagation path. Directional transmission by specific individual radiating elements of the antenna device AE results in greater antenna gain than omnidirectional transmission. The quality of the connections is improved by directional transmission.

If it is assumed that when the mobile stations MS are moving, then multi-path propagation together with further disturbances leads to the signal components from the various propagation paths of a subscriber signal being superimposed as a function of time at the receiving mobile station MS. Furthermore, it is assumed that the subscriber signals of different base stations BS are superimposed at the reception point to form a received signal rx in one frequency channel. The object of a receiving mobile station MS is to detect data d (transmitted in the subscriber signals) in the wanted information ni, signaling information si and data in the organization information.

Figure 2:
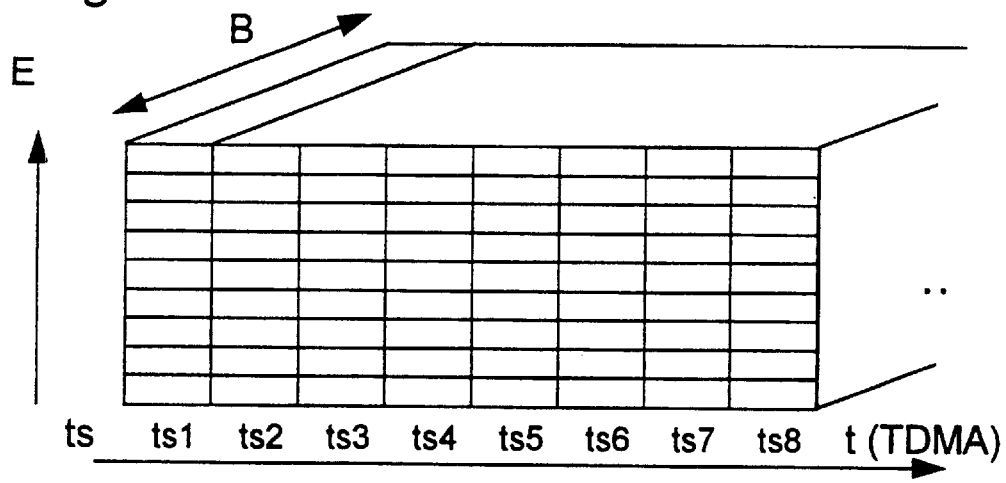
FIG. 2 is a schematic illustration of a frame structure of a radio interface.

FIG. 2 shows the frame structure of the radio interface. Based on a TDMA component, a broadband frequency range, for example with a band width of B=1.6 MHz, is split into a plurality of time slots ts, for example 8 time slots ts1 to ts8. Each time slot ts within the frequency range B forms a frequency channel. Information relating to a plurality of connections is transmitted in bursts within the frequency channels that are intended for wanted data transmission. A plurality of frequency ranges B are assigned to the radio communications system based on an frequency division multiple access (FDMA) component.

Figure 3:
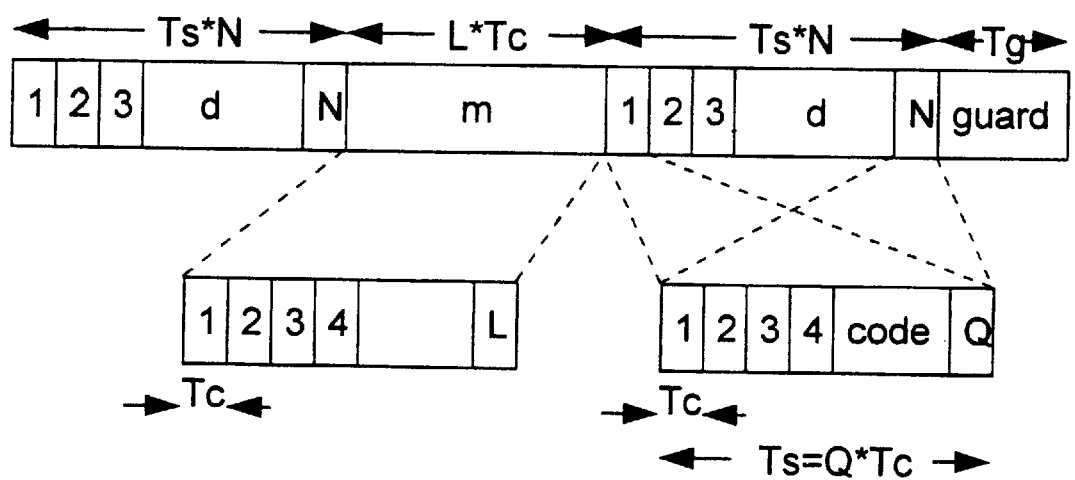
FIG. 3 is a schematic illustration of a layout of a burst.

According to FIG. 3, these bursts for wanted data transmission contain data parts with data symbols d, in which sections with midambles (interblock sequences) m that are known at the receiving end are embedded. The data d are spread for individual connections using a fine structure, a spread code, so that, for example, K data channels DK1, DK2, DK3, ... DKK can be separated at the receiving end by this CDMA component.

Each of the data channels DK1, DK2, DK3, ... DKK is assigned a specific amount of energy E per symbol at the transmitting end.

The spreading of individual symbols from the data d with Q chips results in that Q subsections of duration Tc are transmitted within a symbol duration Ts. The Q chips in this case form the individual spread code. The midamble m contains L chips, likewise of duration Tc. Furthermore, a guard time of duration Tg is provided within the time slot ts, in order to compensate for different signal propagation times on the connections in successive time slots ts. Within a broadband frequency range B, the successive time slots ts are broken down on the basis of a frame structure. Eight time slots ts are thus combined to form a frame, with one specific time slot in the frame forming a frequency channel for wanted data transmission, and being used repetitively by group of connections. Further frequency channels, for example for frequency or time synchronization of the mobile stations MS, are not inserted in each frame, but at predetermined times within a multiframe. The intervals between these frequency channels determine the capacity that the radio communications system has available.

The radio interface parameters are, for example, as follows:

| | |
|---|---|
| Duration of a burst | 577 µs |
| Number of chips per midamble m | 243 |
| Guard time Tg | 32 µs |
| Data symbols per data part N | 33 |
| Symbol duration Ts | 6.46 µs |
| Chips per symbol Q | 14 |
| Chip duration Tc | 6/13 µs |

The parameters may also be set differently in the uplink (MS→BS) and downlink (BS→MS) directions.

Figure 4:
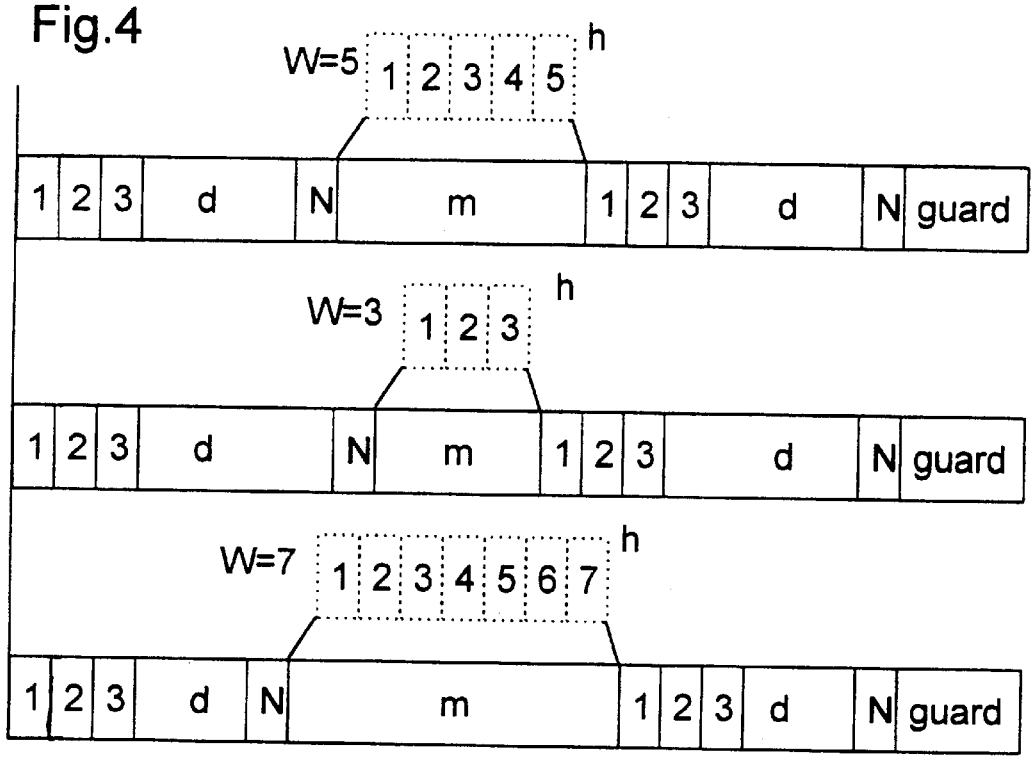
FIG. 4 is a schematic illustration of various bursts.

Influencing of the data rate is shown in FIG. 4. In this case, rather than a constant burst structure, it is assumed that a control device SE causes the burst structure to change. The length of the midamble m, and thus the ratio of the midamble m and data part as well if the length of a time slot is constant, can be matched to the terrain conditions. In complicated terrain conditions, for example in mountain ranges or in fjords, the length of the midamble m is lengthened at the expense of the data parts or of the guard time. In simple terrains, for example flat land, the midamble m can be shortened. The burst structure is advantageously defined as a function of the radio cell. However, it is also possible to adjust the midamble length individually from connection to connection, with connections V1, V2, V3 in a burst structure advantageously being assigned to a common time slot ts1.

The length of the midamble m in this case corresponds approximately to the length W of the channel impulse response h to be estimated, that is to say, in simple terrain structures, the channel impulse response is short, for example W=3, and in complicated terrain conditions it is long, for example W=7.

The length of the midamble m is adjusted on the basis of specific traffic conditions on the radio interface. For example, the control device SE determines parameters relating to the traffic conditions (possibly based on presets from other network components: for example the base station controller BSC).

These parameters for the traffic conditions:
the number M of connections in the time slot, and/or
the terrain classification G for a radio cell, and/or
the transmission quality Q in the time slot.

These parameters may be either values measured at the time or future values, with the latter arising if further connections or data channels are assigned to a time slot ts.

The number M of traffic conditions per time slot directly influences the number of channel impulse responses that can be estimated.

The terrain classification G takes account of the special features of individual radio cells. If the number of connections is constant, the midamble is lengthened for radio cells in mountainous areas or fjords, and it can be shortened for flat radio cells, with few buildings. The terrain classification G is predetermined by the network plan. Real-time adaptation of the channel impulse response h is possible from the radio transmission measured values.

The transmission quality Q is represented by the bit error rate and indicates the quality of the channel estimation. If the previous length W of the estimated channel impulse response h is not sufficient, then this leads to poorer data detection. This can be counteracted by appropriately changing the ratio of the lengths of the midamble m and the data part.

The ratio of the length of the midamble m and the data symbols d is adjusted for individual radio cells in accordance with the terrain classification G. If the traffic conditions in a radio cell fluctuate severely then the adjustment is also dependent on the time slot or time.

Connections with similar traffic conditions are assigned to the same time slot ts, and the optimum midamble length for this time slot is set jointly for all the connections. The time relationship takes account of dynamic adaptation of the burst structure, so that the burst structure is matched to the traffic conditions without any major delay. If the midamble length is dynamically matched to the number M of connections in the time slot and to the length W of the channel impulse response to be estimated, then, on average, the spectral efficiency of the radio interface is improved.

Figure 5:
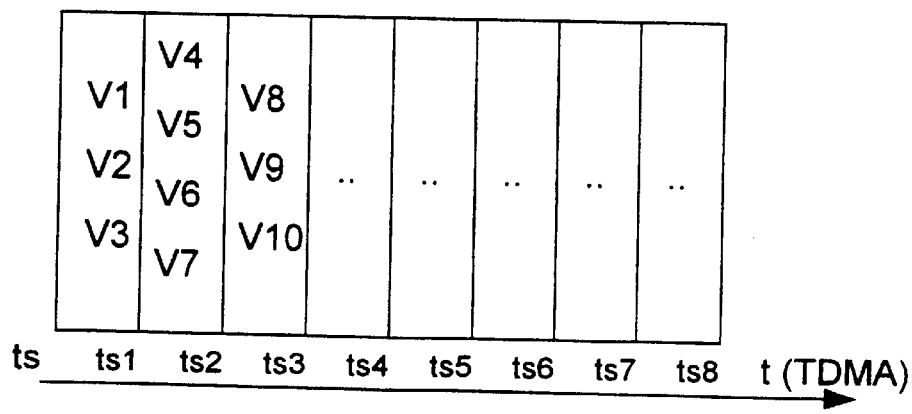
FIG. 5 is a schematic illustration for an assignment strategy for connections to time slots.

FIG. 5 shows one frame of the TDMA structure for the radio interface. The assignment of the connections V1 to V10 to individual time slots ts1, ts2, ts3 is carried out on the network side. In this case, it is necessary to remember that only a limited number of channel impulse responses h can be estimated jointly per time slot ts. This limitation results from the fact that the channel impulse responses contain L chips, the channel impulse responses have W coefficients for precise channel estimation, and M represents the number of connections per time slot. The number of channel impulse types h which can be estimated jointly is in this case limited by the inequality $L \geq M*W+W-1$.

The assignment strategy envisages that approximately the same number of connections are transmitted in each time slot ts. A second aspect that is taken into account is the midamble length in each time slot ts, so that, for example, a greater number of connections are transmitted in the time slot ts2, in which the connections V4 to V7 have a longer midamble m.

By using a common midamble m for a plurality of data channels DK1 and DK2, it is possible to transmit a greater number of data channels DK1 and DK2 in one time slot ts. This leads to an increase in the data rate per time slot ts, or to lengthening of the channel impulse responses h (for complicated terrain structures) which can be estimated in this time slot ts.

Figure 6:
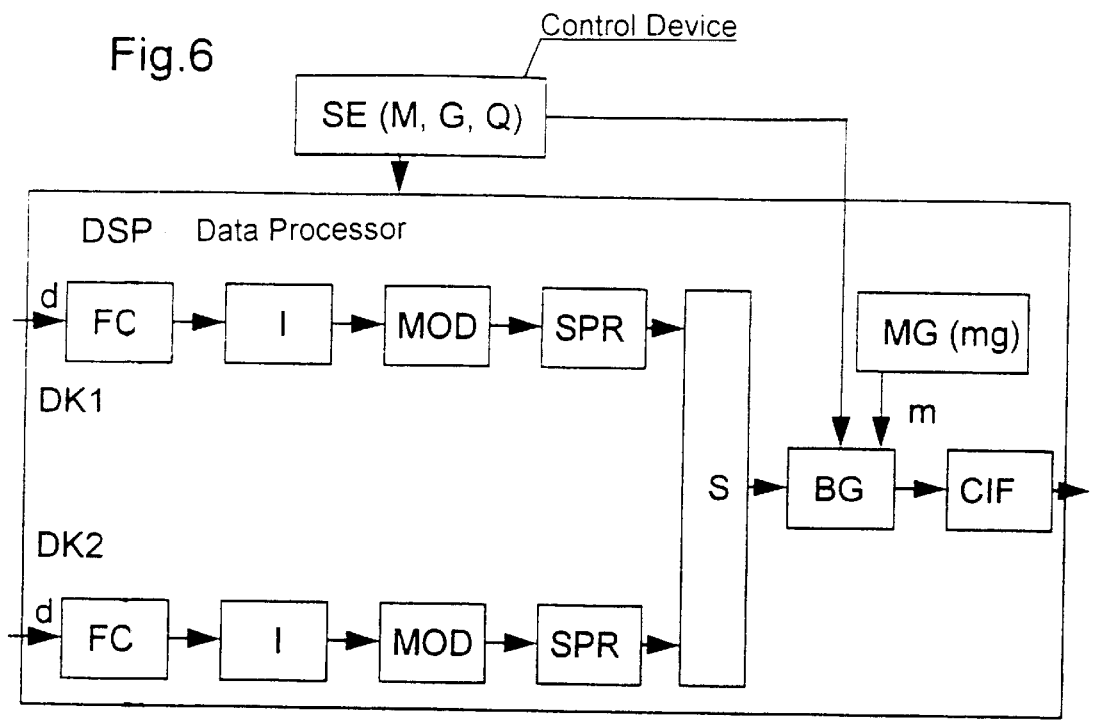
FIG. 6 is a block diagram of a transmitter in a radio station.
Figure 7:
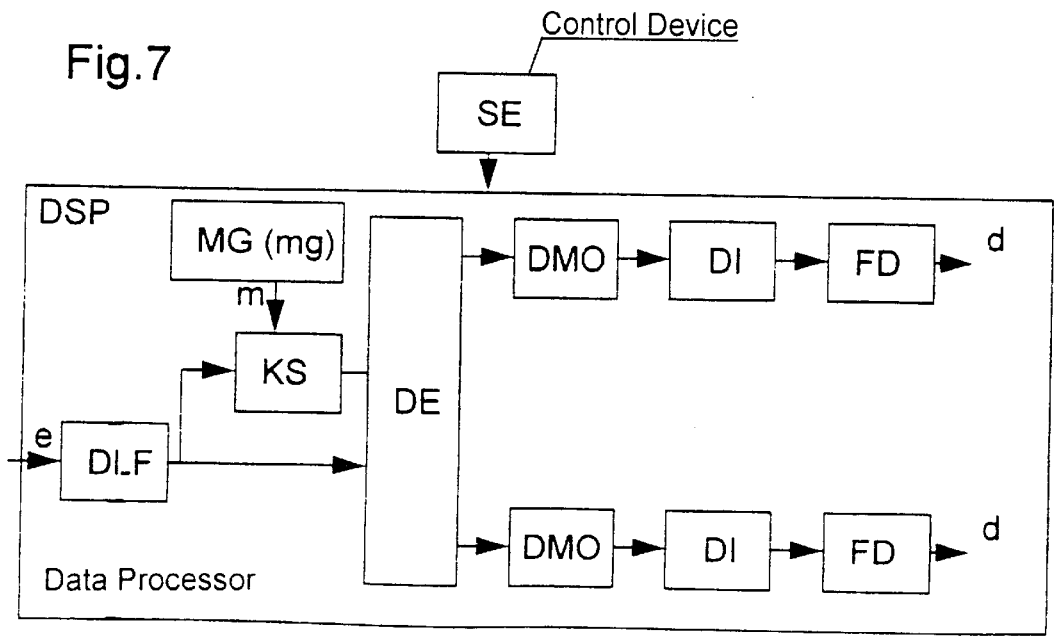
FIG. 7 is a block diagram of a receiver in the radio station.

The transmitters and receivers shown in FIG. 6 and FIG. 7, respectively, relate to radio stations which may be either the base station BS or the mobile station MS. However, the signal processing is shown for only one connection.

The transmitter shown in FIG. 6 receives the previously digitized data symbols d from a data source (microphone or connection on the network side), with the two data parts, which each have N=33 data symbols d, being processed separately. First, channel coding at the rate 1/2 and with a constraint length 5 is carried out in the convolution coder FC, and this is followed by scrambling in the interleaver I, with a scrambling depth of 4 or 16.

The scrambled data are then 4-PSK-modulated and converted into 4-PSK symbols in a modulator MOD, and are then spread, in a spreading device SPR, in accordance with individual spread codes. This processing is carried out in a data processing device DSP in parallel for all the data channels DK1, DK2 in a connection. The illustration does not show that, in the case of one base station BS, the other connections are likewise processed in parallel. The data processing device DSP may be provided by a digital signal processor, which is controlled by the control device SE.

The spread data in the data channels DK1 and DK2 are superimposed in an adder S, with the data channels DK1 and DK2 being given the same weighting in this superimposition process. The discrete-time representation of the transmitted signal s for the m-th subscriber can be produced in accordance with the following equation:

$$s^{(m)}_{q+(n-1)Q} = \sum_{k=1}^{K(m)} d_n^{(k,m)} c_q^{(k,m)}, \text{ where } q=1 \ldots Q, \quad n=1 \ldots N$$

Where K(m) is the number of data channels of the m-th subscriber and N is the number of data symbols d per data part. The superimposed subscriber signal is fed to a burst former BG, which assembles the burst, taking account of the connection-specific midamble m.

Since complex CDMA codes are used, which are derived from binary CDMA codes by multiplication by $j^{q-1}$, the output signal of a chip impulse filter CIF which is connected to the burst former BG is GMSK-modulated and has an approximately constant envelope, if the connection uses only one data chip. The chip impulse filter CIF carries out convolution with a GMSK main pulse.

The digital signal processing is followed at the transmitting end by digital/analog conversion, transformation into the transmission frequency band, and amplification of the signal. The transmitted signal is then transmitted via the antenna device and reaches the receiving radio station, for example a mobile station MS, possibly via various transmission channels.

In this case, one individual midamble m containing L complex chips is used per connection. The M different midambles required are derived from a basic midamble code of length M * W, where M is the maximum number of subscribers (connections) and W represents the expected maximum number of values for the channel impulse response h. The connection-specific midamble m is derived by rotating the basic midamble code to the right through W*m chips, and by periodic expansion up to $L \geq (M+1)*W-1$ chips. Since the complex basic midamble code is derived from a binary midamble code by modulation with $j^{q-1}$, the transmitted signal of the midamble m is likewise GMSK-modulated.

At the receiving end (see FIG. 7), analog processing, that is to say amplification, filtering and conversion to baseband, is followed by digital low-pass filtering of the received signals e in a digital low-pass filter DLF. A portion of the received signal e, which is represented by a vector em of length L=M*W and does not contain any interference in the data part, is passed to a channel estimator KS. The channel estimation for all M channel impulse responses h is carried out in accordance with $$h = \text{IDFT}(\text{DFT}(em)g)$$

where $$g = (\text{DFT}(sm))^{-1}.$$

The data estimation in the joint detection data estimator DE is carried out jointly for all connections. The spread codes are represented by $c^{(k)}$, the received data by $d^{(k)}$, and the corresponding channel impulse responses by $h^{(k)}$, where k=1 to K.

The portion of the received signal that is used for data estimation is described by the vector $$e = A \cdot d + n$$

where A is the system matrix with the a-priori known CDMA codes $c^{(k)}$ and the estimated channel impulse responses $h^{(k)}$. The vector d is a combination of the data $d^{(k)}$ in each data channel in accordance with the following equation:

$$d = [d_1^{(1)}, d_1^{(2)}, \ldots d_1^{(K)} \ldots d_N^{(1)} \ldots d_N^{(K)}]$$

For this symbol arrangement, the system matrix A has a band structure, which is used to reduce the complexity of the algorithm. The vector n includes the noise element. The data estimation is carried out by use of a Zero Forcing Block Linear Equalizer (ZF-BLE), in accordance with the following equation:

$$d = (A^{*T}A)^{-1} A^{*T} e.$$

The components have a continuous value and are unmanipulated estimated values of the data symbols d. In order to simplify the calculation of d, the problem can be rewritten as a linear equation system in the form:

$$(A^{*T}A)d = A^{*T}e$$

where, after Cholesky decomposition $$A^{*T}A = H^{*T}H$$

the determination of the data symbols d is reduced to the solution of the following two systems of linear equations $H^{*T}z = A^{*T}e$ where $H \cdot d = z$.

These equation systems may be solved recursively. H is an upper triangular matrix and $H^{*T}$ is a lower triangular matrix.

The data estimation described here is applicable to one individual data part. Furthermore, the data estimation must take account of the interference between the midamble m and the data parts. Separation of the data symbols in the data channels DK1 and DK2 is followed by demodulation in a demodulator DMO, decryption in a deinterleaver DI, and channel decoding in the convolution decoder FD.

At the transmitting and receiving ends, the digital signal processing is controlled by the control device SE. The control device SE takes account, in particular, of the number of data channels DK1, DK2 per connection, the spread codes for the data channels DK1, DK2, the present burst structure, and the requirements for channel estimation.

In particular, the control device SE influences the superimposition of the data symbols d in the adder S. It is thus possible to adjust the weighting for the data symbols in different data channels DK1, DK2. Apart from equal weighting, data symbols d in a first category (for example signaling information) may also be given higher weightings. The control device SE likewise controls the burst former BG, and thus sets the energy per symbol. The energy per symbol is in this case the same in the data parts and in the midamble m. The data parts may also be given a higher weighting in certain traffic conditions.

The mobile radio network described in the exemplary embodiments and using a combination of FDMA, TDMA and CDMA is suitable for $3^{rd}$ generation system requirements. In particular, it is suitable for implementation in existing GSM mobile radio networks, for which only a small amount of effort is required for the changes.

The configuration of a dual-mode mobile stations MS, which operate both in accordance with the GSM standard and in accordance with the proposed TD/CDMA Standard, is simplified.

By increasing the data rates per time slot, by using common midambles (channel pooling), it is possible to set variable data rates of, for example, k-times 13 kbits/s, step-by-step.

We claim:

1. A method for data transmission in a radio communications system, which comprises:

subdividing a radio interface into time slots for transmission of bursts, wherein, in each time slot, data channels can be distinguished by an individual spread code;

transmitting a finite burst containing data symbols and at least one midamble with known symbols in the time slot;

using the at least one midamble as a common midamble for channel estimation for a plurality of the data channels;

determining at least one parameter for traffic conditions of the radio interface; and adjusting a ratio of a length of the at least one midamble and a data part with the data symbols in dependence on the traffic conditions.

2. The method according to claim 1, which comprises using a number of connections in the time slot as the at least one parameter for the traffic conditions.

3. The method according to claim 1, which comprises using a terrain classification for a radio cell as the at least one parameter for the traffic conditions.

4. The method according to claim 1, which comprises using a transmission quality in the time slot as the at least one parameter for the traffic conditions.

5. The method according to claim 1, which comprises adjusting the ratio of the length of the at least one midamble and the data part with the data symbols as a function of time.

6. The method according to claim 1, which comprises adjusting the ratio of the length of the at least one midamble and the data part with the data symbols for individual radio cells.

7. The method according to claim 1, which comprises adjusting the ratio of the length of the at least one midamble and the data part with the data symbols for the time slots individually.

8. The method according to claim 1, which comprises deriving the at least one midamble used in the time slot from a common midamble basic code.

9. The method according to claim 1, which comprises assigning a connection a plurality of the data channels, with a number of midambles that are used being less than a number of the data channels.

10. The method according to claim 1, which comprises providing the data channels with different midamble lengths with different data rates.

11. A radio station for data transmission in a radio communications system via a radio interface subdivided into time slots for transmission of bursts, comprising:

a signal processing device for producing finite bursts containing data symbols and at least one midamble with known symbols, said finite bursts being transmitted in the time slots, wherein, in each time slot, data channels can be distinguished by and individual spread code, the at least one midamble transmitted as a common midamble for channel estimation for a plurality of the data channels; and a control device for determining parameters for traffic conditions of the radio interface for adjusting a ratio of a length of the at least one midamble and a data part with the data symbols in accordance with the traffic conditions.

* * * * *